Patented June 23, 1953

2,643,259

UNITED STATES PATENT OFFICE 2,643,259

SUBSTITUTED SUCCINIMIDES

Charles A. Miller, Detroit, and Loren M. Long, Grosse Pointe Woods, Mich., assignors to Parke, Davis & Company, Detroit, Mich., a corporation of Michigan No Drawing. Application April 12, 1950, Serial No. 155,564

3 Claims. (Cl. 260—326.5)

This invention relates to two new substituted succinimides which possess a remarkably high order of a particularly valuable type of anticonvulsant activity. More particularly, the invention relates to α-(o-chlorophenyl) succinimide and α-(o-chlorophenyl)-β-methylsuccinimide. These new products can be represented by the formula,

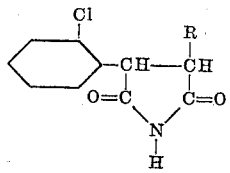

where R is hydrogen or methyl.

In accordance with the invention, these succinimides are prepared by the reaction of the appropriately substituted succinic acid with ammonia. The intermediate reaction product formed is the di-ammonium salt of the succinic acid. This salt upon heating, preferably at about 200–250° C., dehydrates to yield the desired succinimide. The overall reaction can be illustrated as follows:

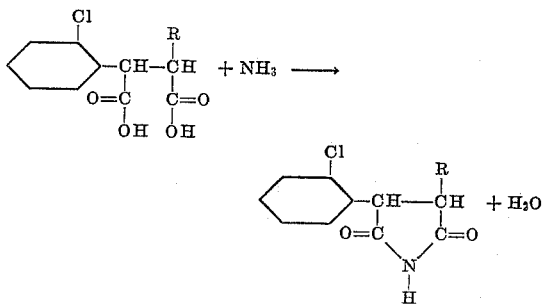

where R is hydrogen or methyl.

The products of the invention are particularly useful in the treatment of the petit mal type of epileptic seizures. They are unique in that they are highly effective against this type of convulsion without the production of the undesirable hypnotic effects usually associated with other anticonvulsants. The products are also of value in the treatment of the grand mal type of epileptic seizures.

When tested by the standard electro-shock methods of Putnam et al. (Science, 85, 525 (1937)) utilizing cats and that of Toman et al. (J. Neurophysiol., 9, 231 (1946)) utilizing mice, the products of the invention exhibit a high degree of anticonvulsant activity as shown in the table. As will also be seen from the table the products of the invention show a high degree of activity in the so-called "Anti-Metrazol test" for the petit mal type of convulsion. This test is performed by feeding five rats weighing 150–200 g. each a predetermined quantity of the drug to be tested, followed in one-half hour by the subcutaneous injection of 93 mg./kg. (95–100% of the convulsion dose) of Metrazol (pentamethylene tetrazole). The rating of the drug is based on the number of the five rats which are protected from convulsions within the half hour following the injection of the Metrazol, a 4+ rating indicating the protection of all five animals.

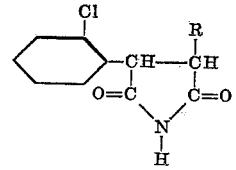

Table

| R | Electro-shock Cat Test—Rating Dose Level, mg./kg. | Electro-shock Mouse Test—Dose of Drug in mg./kg. which protects 50% of the test mice from convulsions | Anti-Metrazol Test—Rating | Dose Level of Drug in mg./kg. |
|---|---|---|---|---|
| CH₃ | | 100<200 | 4+ | 250 |
|  |  |  | 3+ | 125 |
|  |  |  | 1+ | 65 |
| H | 4+100 |  | 4+ | 65 |
|  | 1+50 | ca. 100 | 3+ | 33 |

These compounds are quite non-toxic. For example, α-(o-chlorophenyl) succinimide has a M. T. D of 400 mg./kg. and a LD₅₀ of 881 mg./kg. perorally in mice, and produces no change in hematology, biochemistry or urinalysis of the animal. α-(o-Chlorophenyl)-β-methylsuccinimide produces only slight depression at 250–500 mg./kg. oral dose levels in mice. In general, these compounds are non-toxic, produce no cumulative toxic effect, and have no toxic effect on the hematopoietic system.

The invention is illustrated by the following examples:

Example 1

10 g. of α-(o-chlorophenyl)-β-methylsuccinic acid and 10 g. of concentrated aqueous ammonium hydroxide are heated at 200–250° C. until no more distillate is obtained. The residue is dissolved in absolute ether and filtered. On partial evaporation and cooling the α-(o-chlorophenyl)-β-methylsuccinimide is obtained. After recrystallization from ether by the addition of petroleum ether, the compound melts at 130–131° C. and has the following structure:

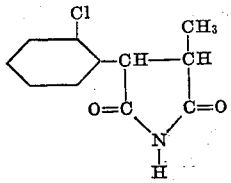

Example 2

10 g. of α-(o-chlorophenyl) succinic acid and about 15 ml. of concentrated aqueous ammonium hydroxide are heated at 200–250° C. until no more distillate is obtained. The dark residue is dissolved in absolute ethanol, charcoaled and filtered. On cooling the α-(o-chlorophenyl)succinimide which separates melts at 129–131° C. After recrystallization this compound melts at 132–133° C. and has the following structure:

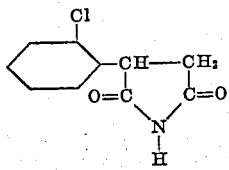

Attention is directed to a copending application filed September 26, 1952 Serial No. 311,798 which is in part a continuation of the instant application and which discloses related chemical compounds useful in the treatment of the petit mal type of epileptic seizures.

What we claim is:
1. A compound of the formula,

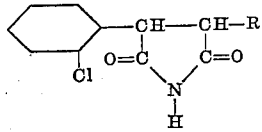

wherein R is a member of the class consisting of hydrogen and methyl.
2. α-(o-Chlorophenyl) β-methyl succinimide.
3. α-(o-Chlorophenyl) succinimide.

CHARLES A. MILLER.
LOREN M. LONG.

References Cited in the file of this patent

FOREIGN PATENTS

| Number | Country | Date |
| --- | --- | --- |
| 389,948 | Germany | Aug. 1, 1922 |

OTHER REFERENCES

Chemical Abstracts, vol. 34, pp. 7879, 7880[2] citing Naps et al., Jam. Chem. Soc. 62, 2450–2457 (1940).